Dec. 1, 1964 — W. T. SIERKE — 3,158,957

INSULATED PLANT CONTAINER

Filed Aug. 1, 1962

INVENTOR
WILLIAM T. SIERKE

BY Beale and Jones
ATTORNEYS

United States Patent Office
3,158,957
Patented Dec. 1, 1964

3,158,957
INSULATED PLANT CONTAINER
William T. Sierke, Mobile, Ala., assignor to
Harris C. Lockwood, Silver Spring, Md.
Filed Aug. 1, 1962, Ser. No. 214,027
4 Claims. (Cl. 47—34)

My invention is directed to an insulated plant container.

In the growing of nursery stock which is container grown there arises the problem of maintaining plant roots at a relatively uniform temperature. This is particularly a problem where the container is of metal which is the usual case. Sudden changes in climatic conditions, i.e., as freezing or excessive heat cause a damaging effect on the roots of container grown plants.

Root damage occurs in these plants when so subjected to sudden freezing or excessive heat changes in the soil in the container. In these metal containers when such climatic changes occur, the temperature change is relatively rapid and it is to guard against such rapid change and to the protection of the roots that this invention is directed.

It is an object of the invention to provide a container assembly for plants that incorporates a thermal insulating liner adjacent the inside wall surface of such container.

A further object of the invention is to provide a relatively thin sheet of insulating material as a liner for the inside wall of a plant container wherein the upper edge portion of the liner extends above the soil level in the container so as to protect the container wall from harmful effects of the soil and plant food placed therein.

Another object of the invention is to provide an insulating liner for metallic plant receptacles wherein to prevent rapid heat exchange between the container wall and the roots within the soil of the receptacles to provide cooler soil temperature in summer thereby requiring less watering and less fertilizer leaching.

A still further object of the invention is to provide an easily manufactured liner for plant containers which has drain aperture means adjacent the lower edge to provide for drainage from within the container through the liner and to an aperture in the wall of the container.

Still further objects and the entire scope of applicability of the present invention will become apparent from the detailed description given hereinafter. It should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the invention reference is had to the drawings in which, FIG. 1 is a side elevational view of the liner in flat condition prior to insertion in a container;

Throughout the description, like reference numbers refer to similar parts.

Figure 1:
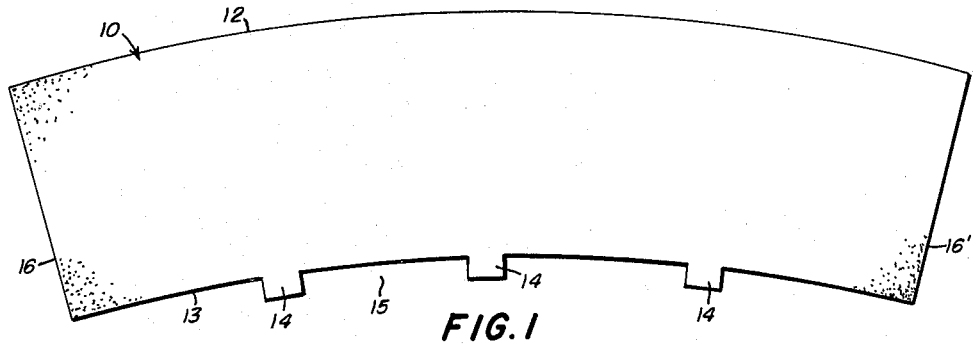
Figure 2:
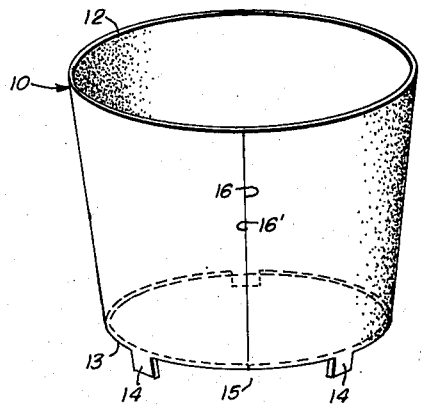
FIG. 2 is a perspective view of the liner rolled into its liner shape prior to insertion into a container.
Figure 3:
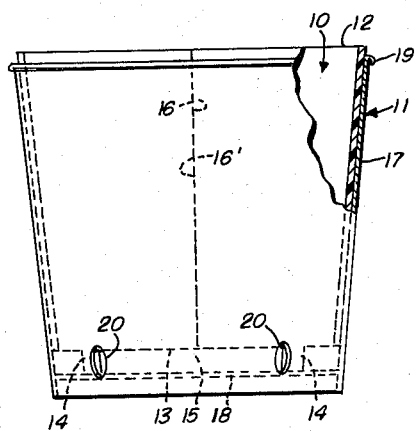
FIG. 3 is a side elevational view partially in section showing the liner inserted in a container.
Figure 4:
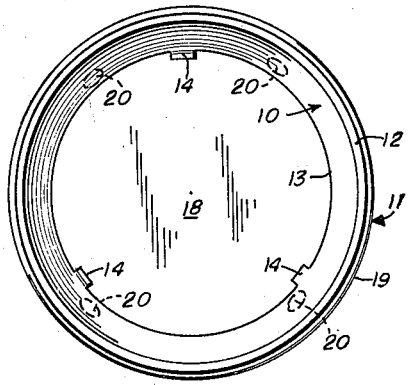
FIG. 4 is a top plan view of the assembled container and liner shown in FIG. 3.

A liner is generally indicated at 10. In its sheet form it has a shape that when rolled will fit the inside wall surface of a container 11, see FIGS. 3 and 4. The liner is cut from sheet thermal insulating material such as polystyrene of about 5/32" thickness. The liner is formed with an appropriate upper edge 12 having in sheet form a relatively large radius of curvature and as corresponding lower edge 13 whose radius of curvature is shorter but from a same center point. The lower edge is formed with cut away portions thus leaving spaced apart depending protrusions 14 which serve as spacers to space the bottom edge 13 from the bottom of the container and thereby providing aperture spaces 15 between the protrusions 14. The opposite edges 16 and 16' of the liner will abut when the liner is rolled to shape for insertion into the container.

A typical plant container of metallic material is indicated at 11 and it has the usual tapered wall 17, a bottom 18 spaced up from the lower edge of the wall 17 and a rolled top edge 19. The wall 17 adjacent the bottom 18 of the container is formed with spaced apart drain apertures 20 therethrough. The drain spaces 15 in the bottom of the liner are so oriented that these drain apertures 20 are allowed free drainage access to the soil to be carried within the liner assembly.

While polystyrene has been indicated as a suitable thermal insulating material for the liner, other adaptable tough heat insulating material could equally as well be used. Other forms of drain apertures could be utilized in the lower portion of the liner so that they would provide drainage from within the container to the apertures 20 adjacent the bottom of the container.

The wall height of the liner 10 is so proportioned with respect to the container 17 with which it is to be used that its upper edge portion as indicated at 10' extends up and beyond the upper rim 19 of the container. This upper portion forms a barrier between the soil top surface and the wall of the container and thus prevents rusting of the container along the soil surface area. The fertilizer agents and water form with the soil a corrosive combination for the surrounding metallic container and thus this previous soil line corrosion and rusting of the container is prevented by the insertion of the liner 10 thus doubling or tripling the life of the container.

This plant container assembly provides a highly efficient plant container especially for growing nursery container stock.

I claim as my invention:

1. A plant container assembly comprising, in combination, a metallic open top end container having at least one drain aperture therethrough closely adjacent the bottom thereof and a thermal insulating member abuttingly lining the interior wall surface of said container to provide a thermal insulating between the wall of the metallic container and soil and plant roots adapted to be carried in the container, said insulating member having elongated drain opening means therein extending generally transverse to the vertical height of the insulating member and in communication with said drain aperture in the container, said elongated drain opening means being larger in its elongated direction than said drain aperture whereby said liner will permit the drainage from the drain aperture in a number of positions, and said insulating member having an upwardly extending collar portion thereof extending up beyond the upper edge of the container to fully isolate the soil from the metal wall and any fertilizer applied to the soil thereby preventing corrosion of said container wall.

2. A plant container assembly comprising, in combination, a metallic open top end container having at least one drain aperture through the wall thereof adjacent the bottom end and a thermal insulating relatively thin walled member abuttingly lining the interior wall surface of said container to provide a thermal and isolating barrier between the wall of the container and soil adapted to be carried therein, said liner member having circumferentially spaced apart leg members depending from the bottom edge thereof and spacing the same from the bottom of the container and providing an elongated drain access therethrough to the drain aperture of the container, said elongated drain access extending generally transverse to the vertical dimension of said liner member and being larger in the elongated direction than said drain aperture so that drainage will be provided from said drain aperture in a number of positions of the liner, said insulating member having an upper annular portion thereof extending upward beyond the top edge of the container.

3. An insulating liner for a plant container having spaced apart drain apertures therethrough adjacent its bottom comprising an elongated sheet of relatively thin thermal insulating material adapted to be rolled to fit the interior wall surface of a plant container and having spaced apart aperture means therethrough adjacent the lower edge, said spaced apart aperture means being elongated and extending generally parallel to the lower edge thereof and larger in the elongated direction than the drain apertures whereby the liner may be placed in a number of rotated positions in said container and still have the spaced apart aperture means lined up to provide drainage to drain apertures adjacent the bottom of said container.

4. An insulating liner for a plant container having spaced apart drain apertures adjacent its bottom comprising an elongated sheet of relatively thin thermal insulating material having an arcuate upper edge and a corresponding arcuate lower edge adapted to be rolled to fit the inside wall surface of a container and having circumferentially spaced apart depending foot portions extending from the lower edge thereof to space the lower edge of the liner from the bottom of a container and to form therebetween elongated drain openings, said elongated drain openings extending generally parallel to the lower edge of said liner and being larger in the elongated direction than the drain apertures, whereby liner may be placed in a number of rotated positions in said container and still have the elongated drain openings lined up to provide drainage to said drain apertures adjacent the bottom of said container.

References Cited in the file of this patent

UNITED STATES PATENTS

| | | |
|---|---|---|
| 314,682 | Kaiser | Mar. 31, 1885 |
| 583,925 | McGowan | June 8, 1897 |
| 955,644 | Hershkovitz | Apr. 19, 1910 |
| 1,856,179 | Wells | May 3, 1932 |
| 2,020,226 | Adams | Nov. 5, 1935 |
| 2,073,695 | Haysler et al. | Mar. 16, 1937 |
| 2,652,148 | Pfeifer | Sept. 15, 1953 |
| 3,025,636 | Warren | Mar. 20, 1962 |